3,350,803
DISPLAY DEVICE
Jane C. Stockwell, Hartford, Conn., assignor to Dyna-Lite, Incorporated, Brookline, Mass., a corporation of Connecticut
Filed Feb. 16, 1965, Ser. No. 433,143
9 Claims. (Cl. 40—106.53)

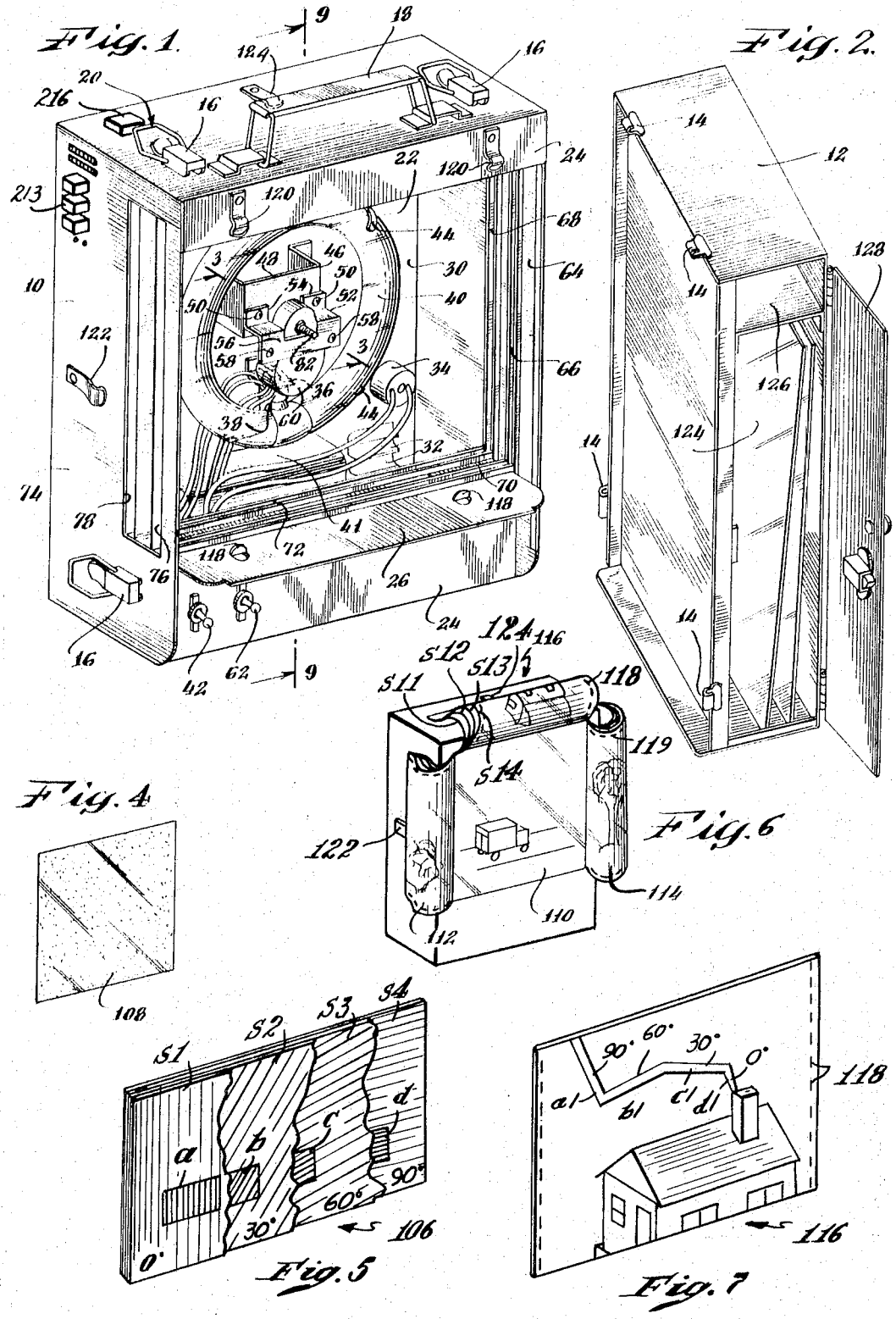

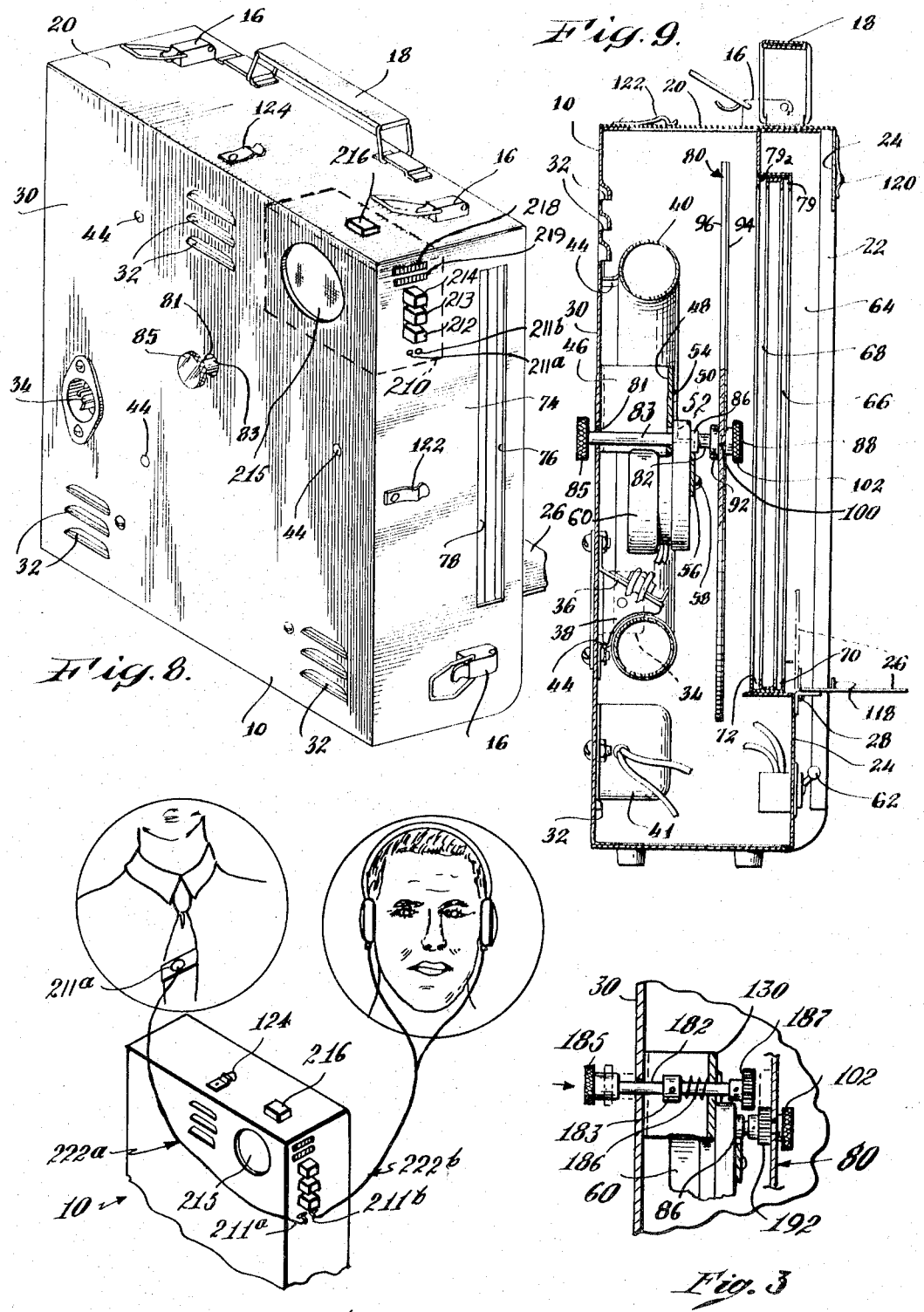

This is a continuation-in-part of application Ser. No. 284,964, filed June 3, 1963.

This invention relates generally to a display and viewing device and more particularly to a self-contained portable device of this type wherein novel visual effects can be created and which is well suited for advertising and educational purposes.

Display devices have been developed in the past for creating various striking visual effects, such as changing colors, shifting colors, and pulsation or movement in a graphic representation, wherein polarized light has been employed in association with polarizers and analyzers made for example of preoriented birefringent or vectograph material. Such devices are described in U.S. Patents Nos. 2,393,968, 2,393,969, 2,393,970 to Burchell, 2,882,631 to Boone, and 3,054,204 to Yates. However these heretofore proposed devices are of limited application and do not possess the degree of functional versatility which is desirable in an educational display device of this type. None of them are capable of creating the full range of visual effects which are desirable and possible, being mainly limited to use with polarized light and materials pertaining thereto. They are not readily convertible to utilization with clear light and ordinary static photographic or graphic transparencies, and to quick changes from displaying materials with polarized light of various character to work with other materials using ordinary light.

Objects of the invention are to provide an improved viewing device and/or audio-visual device capable of creating varied simulated motion effects with polarized light on either single or overlay-type transparencies, or which can be used with non-polarized, single or multilayered overlay-type transparencies of the conventional overhead projector type, and wherein either type of transparency, polarized or non-polarized can be used in conjunction with information that can be recorded and reproduced with apparatus installed within a small section of the viewing device, for a more comprehensive understanding of the subject matter;

To provide a display device of the foregoing type which can be easily and inexpensively manufactured at low cost and which, though versatile in operation, is readily operated and manipulated to create any desired visual effect within a wide range;

To provide a display device which permits conveniently mountable and interchangeable use of various stationary and movable components incorporating non-polarizing components as well as polarizing components with various angles of polarization, superimposed or juxtaposed, always within a minimal space;

To provide a display device that conveniently accommodates a drive for rotating a display component member either by hand or with appropriate motor means;

To provide a device of this type which utilizes and efficiently accommodates illumination means, tape recording equipment, and motor and manual drive means particularly suited for the purpose at hand, and which serves for the convenient, easily accessible, and safe storing of interchangeable or demountable display components;

To provide a display device of the foregoing type which is portable and constructed to constitute a stage for photographing, closed circuit televising and audio as well as video taping appropriate subject matter, either as a self-contained unit or in conjunction with existing language laboratory equipment; and To provide a display device which is compact and comparatively light, and which will accommodate for secure transport as well as for easy availability, essential as well as auxiliary components of the viewing device.

Other objects and novel aspects of my invention will be apparent from the following description of a preferred embodiment thereof with several modifications, which refers to drawings wherein;

FIG. 1 is an isometric view of a display device incorporating the invention, without cover;

FIG. 2 is a similar view of a cover for the display device according to FIG. 1;

FIG. 3 is a side view of a modification of the manual shaft rotating device with the housing in section as in FIG. 9;

FIGS. 4, 5 and 6, respectively, are isometric views of a diffuser slide, a transparency slide including a birefringent material formation, and a graphic transparency slide with polarized folding overlays;

FIG. 7 is a diagram illustrating the optical construction of display transparencies such as used for the display of FIG. 6;

FIG. 8 is an isometric view of the side, top and rear of the display device of FIG. 1, illustrating the side and rear exterior construction;

FIG. 9 is a sectional view taken substantially on line 9—9 of FIG. 1; and

FIG. 10 is a diagram illustrating the use of combined visual and acoustic equipment according to the invention.

As shown in the drawings, the display device comprises a generally box-like open-faced housing 10 the front of which is illustrated in FIG. 1, which may conveniently be closed for storage or transportation by having associated therewith a combination storage and closure cover 12 shown by itself in FIG. 2. For the purpose of providing for quick and easy connection and disconnection of the housing 10 and cover 12, cooperating fastening means are provided, and as illustrated, take the form of clips 14 on the cover 12, and spring fastening clamps 16 on the housing 10. In order to facilitate carrying of the housing 10 either alone or when it has the closure 12 assembled to it, a retractable handle 18 is formed on the exterior of the top wall 20 of the housing.

In operation, the display device is generally disposed as illustrated in FIG. 1 with the closure 12 removed. In this condition the interior of the housing may be seen through a rectangular opening 22 formed in the front wall 24. Adjacent the bottom edge of the opening 22 there is mounted a tilting shelf 26 which, as can be clearly seen in FIG. 9 is pivotally mounted by hinges 28 between a generally horizontal solid line position or a generally vertical dotted line position. Shelf 26 is used to support static or motion simulating transparency slides, either single or with a plurality of overlap, under certain conditions, as will be subsequently explained. However, in general it should be understood that, as viewed in FIG. 1, the opening 22 in use defines a viewing zone which is presented to the viewer.

The rear wall 30 includes a plurality of ventilating louvers 32 to permit air to circulate within the interior of the housing 10, and also an aperture for the speaker to be described hereinbelow. Rear wall 30 supports an electrical cord connector 34 which has its connector means accessible from the exterior of the rear wall for convenient connection of a detachable, such as grounded three wire power supply cord thereto. As illustrated, the connector 34 is of the detachable interlocking type. The display device includes within its housing 10 an illuminating means and an electric motor which must be powered, and the source of electrical current is supplied through the connector 34.

On the inside surface of the back wall 30 there is rigidly secured, as by welding, an angle plate 36 which supports and forms a part of a lamp mounting fixture 38 that is designed to accommodate a C-shaped fluorescent tube lamp 40. Ballast 41 is also mounted on the interior of the rear wall 30 near the bottom thereof. Fixture 38, fluorescent tube lamp 40 and ballast 41 are currently readily available on the open market. The fixture 38 and ballast 41 are connected by lead wires into an electrical circuit that includes a manual control switch 42 mounted on the front wall 24 at the bottom thereof, which is illustrated as a toggle switch but may take the form of any convenient type of manual switch. The circuitry for the fluorescent lamp 40 is such as to be wired to the connector 34 and thereby supplied with electrical current when the switch 42 is closed. Therefore, snapping of the toggle switch 42 will either energize the lamp 40 and illuminate it or de-energize it and extinguish it. A plurality of spring mounting clips 44 are secured, as by riveting, on the inner surface of rear wall 30 and position and aid in the support of fluorescent tube lamp 40. When so mounted, the lamp 40 directs its illuminating rays through the housing opening 22. Secured to the inside of the housing is the chassis 210 of a tape sound recorder reproducer, the speaker, connectors, and controls of which are accessible through appropriate housing apertures as will be described in detail hereinbelow.

On the inner surface of the rear wall 30 there is also mounted a bracket 46, as by welding. The bracket 46 includes a flat plate mounting portion 48 which is offset and spaced forwardly of the rear wall 30. Detachably secured to the mounting portion 48, as by screws 50, is a Z-plate 52. Plate 52 is generally U-shaped when viewed from the front, and includes rearwardly offset mounting feet 54 through which the screws 50 extend and a forwardly offset flat plate portion 56. Mounted on the plate portion 56 of the Z-plate, as by screws 58, is an electric motor 60 which may conveniently take the form of the well known synchronous clock motor type, and be of a set speed such as 15, 30 or 60 r.p.m.'s or wound to provide multiple speeds, as desired. It may be assumed that the illustrated motor is of a single-speed type and therefore it is controlled by manual switch 62 similar to lamp switch 42 and mounted adjacent thereto. It should be noted, however, that the motor 60 may be readily dismounted and interchanged with a motor of a varying speed. However, if it is desired to have a multiple-speed motor, it will be understood that the switch 62 will incorporate a speed selector mechanism to permit manual selection of the desired speed. Appropriate lead wires interconnect the motor 60, the control switch 62, and the connector 34 to power the motor. When assembled, the motor 60 is disposed centrally of the lamp 40.

The right side wall 64 supports on its inner side a member or members forming a pair of spaced parallel vertical channels 66, 68 adjacent the opening 22. On the inner side of the upper edge of front wall 24 adjacent but back of the lower edge of opening 22 of the front end there is disposed a member or members forming a pair of horizontal channels 70, 72, which are respectively aligned with channels 66, 68. The left side wall 74 includes a member or members forming a pair of reinforced spaced slots 76, 78, which are aligned with the channels 66, 68, respectively. In the vicinity of the intersection of the top wall 20 and the upper portion of the front wall 24 there is disposed a member or members forming spaced horizontal channels 79, 79a which are parallel to, spaced from and aligned with the horizontal channels 70, 72, respectively. The channels 66, 68, 70, 72 and 79, 79a are respectively aligned to form U-shaped trackways to receive rectangular slides which have access to the trackways through the slots 76, 78 and are slid horizontally from left to right to mount them in the display device and reversely slid to remove them. In other words, rectangular transparency slides or other rectangular plates, such as light diffusers, may be inserted selectively into either or both slots 76 and 78 and moved horizontally within the trackways formed by the referred-to-channels. When in such positions, as illustrated in FIG. 9, they are interposed between the viewer and the display device, particularly the interior mechanism, such as the fluorescent tube lamp 40, the ballast 41 and the motor 60.

From the foregoing, it will be understood that the housing 10 creates the effect of a portable miniature stage and that rectangular slides may be selectively inserted adjacent the viewing opening 22. When the fluorescent tube lamp 40 is illuminated, the light which emits from it passes through any light transmitting, translucent or transparent slide placed in the trackway. In order to create varying desired visual effects employing polarized light, a polarizing member, which may conveniently take the form of a polarizing disc 80 (see FIG. 9) is detachably but firmly secured to the drive shaft 82 of the motor 60. In FIGS. 3 and 9 there is illustrated the relationship of the drive shaft 82 and the polarizing disc 80. The drive shaft 82 is mounted for rotary bearing contact in a bushing 86 supported by the motor housing. The drive shaft has a reduced portion (not shown) which is threaded, and which forms with the shaft a separating shoulder. A plane washer 92 is disposed adjacent the shoulder and the polarizing disc 80, which comprises a disc of any suitable known polarizing material 94 and stiffening backing disc of isotropic material 96 (FIG. 9), both of which are centrally apertured at 100 to be slid onto the reduced portion of the drive shaft. A detachable securing member, which may conveniently take the form of a wing nut or preferably a knurled cap nut 102 is used to lock the polarizing disc 80 on the drive shaft. It will be understood that the co-operating threads on the reduced drive shaft and of the bore of the nut run opposite to the direction of rotation of the drive shaft for self-tightening, such that if the shaft runs clockwise, the threads on the shaft and on the nut bore are left-handed. Nut 102 can be quickly removed from the drive shaft by rotating it clockwise to remove the polarizing disc 80 to eliminate it entirely or to substitute another polarizing disc having different characteristics. This disc mounting construction provides a quick and easy way of removing polarizing discs from the drive shaft and of securely mounting them thereon.

It will be apparent from the foregoing that polarizing discs of desired character can be mounted on the motor drive shaft and rotated at a desired speed. It is sometimes desirable to display certain objects by manual rotation of a polarizing disc. To achieve this effect, the motor drive shaft 82 has a rear extension 83 extending through the motor casing and the opening 81 in the rear wall 30. The free rear end 85 of the extension 83 is knurled to permit manual grasping and turning of the drive shaft and disc mounted thereon.

Another embodiment of a manual disc rotating device is shown in FIG. 4. This modification is preferable because it is automatically disengaged from the motor when not in use, thereby reducing friction and permitting the use of an inexpensive, low torque motor. This construction also excludes the possibility of objects catching on the continuously rotating knob according to FIG. 9. In FIG. 4, the washer 92 of FIG. 3 is replaced by a gear wheel 192 fastened to shaft 82. A bracket 130 is fixed to the rear wall 30 of the housing. It carries in appropriate simple bearings a manual drive shaft 182 which can axially slide within limits defined by stops such as the collar 184 and the knurled knob 185 which corresponds to knob 85 of FIG. 9. A spring 186 tends to move the knob 185 into the position shown, disengaging from gear 192 a gear wheel 187 that is fastened to 182. Due to the action of spring 186 this is the normal position, and in order to drive the disc 80 manually, the knob 185 must be pushed towards the back wall of the housing 30 and also rotated. This position is shown in dotted lines.

As shown in FIGS. 1 and 8, the present device conveniently accommodates conventional recording and reproducing apparatus in closely juxtaposed combination with the transparency equipment, for optimally efficient operation by a single person. The chassis of a tape sound recorder is indicated at 210. It has microphone and earphone jacks 211a and 211b, respectively, also play, stop and rewind controls 212, 213, 214, a speaker 215 communicating through the above-mentioned opening in the rear wall of the housing, and a recording button 216. Further provided are a speed control 218 and a volume control 219. For the purpose of changing tape and for performing other required operations as the case may be, the recorder is conveniently and without obstruction accessible from the front of the housing. The microphone jack 211a permits the insertion of a plug at the end of a wire leading to a small microphone carried by the speaking operator who presses the recording button 216 for the verbal recordation of the subject matter of any static or simulated moving transparency. This is illustrated in FIG. 11 where 221a is the microphone plugged at 222a into the microphone jack 211a. As likewise indicated in FIG. 10, the earphone jack 211b can receive an earphone plug connecting at 222b with the head set 221b of a listener who uses it as part of language laboratory equipment, such as for the purpose of a private audition of previously recorded subject matter pertaining to any static or apparently moving transparency, whereby speed and volume can be adjusted with speed control 218 and volume control 219.

When employing polarizing disc 80, with reference to FIG. 9, to create different visual effects including simulated motion with polarized light, a transparency slide 106 as shown in FIG. 5 may be employed, and this may conveniently take the form of a composite plate-like slide with one or more properly oriented layers of birefringent material fastened thereon in any desired manner, and having thereon areas covered with filter material which completes the polarizing effect. This structure will be described more in detail herein below with reference to FIGS. 5, 6 and 7.

With reference to FIG. 9, the transparency slide 106 may be disposed in the forward trackway formed by channels 70, 66 and 79, by having been slid through the slot 76.

In use of the display device, it is convenient to employ a simple light-diffusing or filtering slide 108, such as shown in FIG. 5, in the rearwardmost trackway formed by channels 72, 68 and 79a by sliding it through the slot 78, though it is not mandatory, being simply an optional use of the rearwardmost trackway. The purpose of employing the diffusing filter slide 108 is that in operation, transparency slides are frequently interchanged in the forwardmost trackway, and in the absence of a diffusing filter slide, the naked light from the fluorescent tube lamp 40, as well as the interior construction of the display device, would be visible to the viewer and adversely detract from the presentation by either blinding the viewer or presenting the relatively unsightly interior of the device. This is undesirable purely for esthetic and psychological reasons and reasons of comfort of the viewers.

With the display device set in condition as illustrated in FIG. 9, with a transparency slide 106 mounted in the forwardmost tracking, energization of both the motor 60 and the lamp 40 will result in the rotation of the polarizing disc 80 and illumination of the rearward side of the slide 106 by a stream of polarized light of changing characteristics. This will create the simulation of the various animated visual effects, such as color changes, shifts, pulsations, and movement of the graphically illustrated material on the transparency slide 106, depending upon its formation, particularly with regard to the use of color and disposition of birefringent and polarizing material. A large variety of visual effects, including color changes with regard to saturation, hue and intensity, as well as the effects of pulsation and movement, can be created. As previously pointed out, the motor 60 may be of a multispeed type or physically interchangeable with a motor of a different speed, in which case by selecting a different speed, another range of visual effects can be achieved.

It will be apparent that the present display device is exceptionally well suited for versatile visual demonstration employing polarized light and that a number of variables may be selected to create different ranges of visual effects. One of the variables is the type of birefringent material used in conjunction with the filter. Another is the number of layers of birefringent material, how they are oriented as depending upon the proper orientation and number of layers, and how the natural colors of the continuous spectrum and their complement can be seen.

To display effectively, dramatically, and efficiently overlay transparencies such as will be described with reference to FIGS. 5, 6 and 7, the diffuser 108 may or may not be used, as desired. The pivot shelf 26 is tilted to its horizontal position as shown in solid lines in FIG. 9. A pair of tabs 118 are struck out of the shelf 26 and are in this shelf position substantially coplanar with the forward edges of the housing's left and right walls 64, 74 and with the surface of top portion of the front wall 24. Thus the surface of the upper portion of the front wall 24 and the front edges of the side walls and the rear edges of tabs 118 are substantially coplanar and constitute a means for positioning a static transparency slide, with or without overlays or a polarized slide, with or without overlays.

For this purpose a slide is preferably used the main portion of which has some rigidity and is capable of contacting the front edges of the side walls and being slipped under spring clips, 120, disposed at the top portion of the front wall 24. When so positioned, as in FIG. 6 the upper portion of the main part of the slide 110 is slipped under the clips 120, the lower part is disposed behind the tabs 118 (FIGS. 1 and 9). If only the graphic material illustrated on the main portion of 110 is desired to be displayed, the overlay 112 is folded forwardly away from the main portion to the left side of the display device viewer and secured under spring clip 122, mounted on the left side wall 74. The overlay 114 is similarly bent to the right side of the display device viewer and secured under a similar spring clip (not shown) attached to the right side wall. The top overlay 116 is folded upwardly and is secured under the spring clip 124 mounted in the center, toward the rear of the top wall 120.

The arrangements described with reference to FIGS. 5 and 6 can be utilized for simulating motion by means of polarized transparencies carrying diagrammatical or illustratively naturalistic representations for the visual interpretation and explanation of various theoretical and practical subject matter. This can be accomplished with the aid of expedients which will now be explained, and this constitutes an especially valuable aspect of the invention.

The slide 106 (FIG. 5) or 110 (FIG. 6) displays an outline, coordinate system, or otherwise correlating representation, in the form of a line drawing, half tone illustration, photograph, or similar transparency material. Superimposed in accurate register thereon are polarization differentiated patterns or designs, prepared by applying pattern elements in terms of filter material such as an iodine preparation, to oriented sheets such as a stretched polyvinyl alcohol. Various pattern elements are joined in register to form an overall pattern wherein the pattern elements are differentiated in terms of polarization angle. This is accomplished as follows:

A requisite number, for example four, separate overlay sheets s1, s2, s3, s4 (FIG. 5) are prepared, each of pre-oriented synthetic material. In FIG. 5, the orientation is indicated by hatching. In selected areas, representing pattern elements, the sheets are treated with iodine. These areas are indicated at a, b, c, d with their polarization angles for example 0, 30, 60 and 90 degrees respectively. The sheets are accurately registered after the polarizing structure has been completed by surfacing the pattern elements, to form the sheet assemblies or arrays 112, 114, 116. The surfacing can be applied either by hand, or by printing from a master if a large number of such sheets is required. The angles of polarization can be correlated in a manner now to be described.

Referring to FIG. 5, the sheets s1, s2, s3, s4 are registered such that they present a line composed of 0, 30, 60 and 90 degree polarizing elements, respectively (FIG. 5). Thus, the angles of polarization are different for consecutive pattern elements from zero to 90 degrees. If the four sheets are for example fastened to a slide such as 106 with tape and the disc 80 is rotated, a bright region will appear to travel along the line pattern.

Referring to FIGS. 6 and 7, numerals s11, s12, s13, s14 represent complete overlay sheets. It will be understood that the pattern elements a1, b1, c1, d1 of FIG. 7, polarizing at 0, 30, 60 and 90 degrees, respectively, are registered with each other and with the basic design on slide 110. In this instance, the four sheets are fastened together in register by stapling at 118, 119 and together form an overlay structure 116 as above described. A series of overlay groups 112, 114, 116 can thus be applied to the slide 110. For example, the basic art work could be an automobile, on which can be superimposed overlay 116 showing a house being struck by lightning. With the light source turned on and polarizer disc 80 rotating, the areas which are polarized at various angles will cyclically transmit more or less light, simulating motion, such as the striking of a lightning flash in the present instance, against the static background of the house on the overlay 116. Other environmental objects can be similarly presented, with or without simulated motion, by means of overlays 112 and 114. It will be understood that a greater number of sheets, that can be conveniently handled can be employed.

It will now be apparent that this display device viewer is exceptionally well suited for versatile visual demonstration, whether the transparencies are static or polarized as the polarizing wheel within this device can be retained for either type of presentation by simply energizing or de-energizing the electrical power to the motor which rotates the polarizing member. If for any reason it is more desirous to remove the polarizing wheel this can be accomplished by a simple turn of the detachable securing member 102 to the right, thereby releasing the polarizing wheel.

As a further feature of versatility of this display device viewer it will be noted that it can also serve a very practical function as a light table working surface for the preparation of any type of the aforementioned visual transparencies.

To position the viewer device 10 for use as a light table it is tilted against any secure surface to a convenient work angle. When the back 30 of the viewer 10 is so positioned, the light diffuser slide 108 can be placed to rest across the front rectangular open aperture area 22, against the edges of the two side walls 64 and 74, respectively, where it can be secured under two spring clips 120, positioned on either side of the upper front wall 24 and further secured within the two tabs 118 struck out of the hinged platform 26. These tabs are directly aligned with the front edges of the two side walls, and the hinged extended platform 26 supports the light diffusing means. The removal of the polarizing means 80 is optional in this instance and it does not essentially interfere with the light. If a cool-white fluorescent tube 40 is used, its position within the housing will direct its rays through the aperture area 22, thereby providing cool evenly distributed light for the working surface of the light diffuser 108 and converting the viewer device into a practical light table means for the preparation of transparencies or for tracing purposes.

The above described detachable closure cover 12 (FIG. 2) can be opened on one end with a pivoted door 128 to permit access to two separate storage compartments for the transparencies 124, and a shelf area 126 above this for a detachable power cord. Cooperating fastening clips 14 on the top and sides of the cover 12 and spring fastening clamps 16 positioned on the top and sides of the viewer device are operatively associated and can be clamped together for the secure closing of the detachable closure and storage cover. This self-contained unit can be conveniently transported by the use of a retractable handle 18, attached securely on the top of the viewer device.

Summing up the functional versatility and potential of the present viewer within an educational system, the device can be used for any and all of the following functions. It is a perfectly proportioned "stage" for a television camera when used directly or as a means to videotape a transparency for later use as a part of a movie or a presentation. It is especially applicable to subject matter of the scientific field wherein many phenomena could heretofore only be taught on a high educational level involving college mathematics or quantum mechanics. With proper use of the present viewer, such can be taught on a much lower level of education when employed in conjunction with prepared graphic or schematic transparencies which are polarized to simulate motion thereby creating a visual description of various theorems making them meaningfully understandable. This visual description can be made even more meaningful with the aid of the audio complement of the present viewing device, whereby a student can receive private instruction by applying headphones to the appropriate output jack of the device and by controlling sound volume and continuity with the appropriate controls. Also, the student is enabled to add his comments, and blank tape for that purpose can be provided in the recorder. Two characteristic examples are as follows: First, the understanding of polarization, with a graphic description of the difference between non-polarized and polarized light, and secondly the visual interpretation of the optical maser whereby with the proper graphic description, the quantum of energy in the continuous spectrum can be related to coherent light and sound. In other practical aspects, this viewing device provides an essential every day utility for a school's already prepared library of overhead-type projectuals as both a viewer and for the storage of a complete presentation within its combination with a detachable closure-cover. Further, the preparation of any transparencies, static or polarized can be accomplished on the aperture viewing surface of the viewer by converting it to use as a light table. The detachable power cord interlocks with a connector on the rear wall of the device by twisting and the power cord has a grounding means for the safety of any person using this device which, still further, is of a practical size and of a lightweight material, and provides a combination storage and closure detachable cover for both the transparencies and the detachable power cord.

It should be understood that the present disclosure is for the purpose of illustraton only and that this invention includes all modifications and equivalents which fall within the scope of the appended claims.

I claim:
1. A display device comprising:
   a housing having an open front end;
   illuminating means disposed in said housing for directing light through said open end;
   a polarizing member between said illuminating means and said open end;

transparency means inserted at said open end and including
a plurality of birefractive flexible sheets superimposed on each other with the directions of birefringency selectively different for different sheets; and
dichroic material applied to selected design areas of each sheet to render the sheets selectively polarizing in said areas, respectively, in accordance with said selected birefractive directions; and
means for securing said sheets with respective edges to said housing, for insertion in said open end in register to present in response to said illuminating means a design in terms of the different angles of polarization of the respective sheets.

2. Device according to claim 1 wherein said securing means includes means for fastening an edge of each of said plurality of superimposed sheets to one of a plurality of corresponding edges of said open front end.

3. Device according to claim 1 wherein said transparency means includes a rigid slide member carrying a nonpolarized design placed and capable of supporting said plurality of superimposed sheets.

4. For use in display devices, composite sheeting carrying a design, comprising:
a plurality of sheets of birefractive material with design areas superimposed in register of design with the direction of birefringency selectively different for different sheets; and
dichroic material applied to selected design areas of each sheet to render the sheets selectively polarizing in said areas, respectively, in accordance with said birefractive direction.

5. Composite sheeting according to claim 4, further comprising a non-polarized sheet carrying a design and superimposed on said birefractive sheets in register with said design areas.

6. Composite sheeting according to claim 4, wherein said birefractive material includes a stretched polyvinyl alcohol and said dichroic material includes iodine.

7. A display device comprising:
a housing having a rear wall and an open front end;
illuminating means disposed in said housing for directing light through said open end;
means for holding transparency means in said open end;
a polarized member between said illuminating means and said open end;
a motor mounted on said housing;
a shaft, driven by said motor, extending towards said open end, and including means for detachably holding said polarized member;
a second shaft driven by said motor extending oppositely said first shaft;
normally disengaged means for coupling said second shaft to said first shaft; and
means extending from said housing for manually coupling said two shafts and for manually driving said first shaft.

8. Device according to claim 7, wherein said coupling and driving means include a first gear wheel on said first shaft, a second gear wheel on the inner end of said second shaft and engageable with said first gear wheel; means for slidably pivoting said second shaft; elastic means for forcing said second shaft towards disengagement of the gear wheels; and wherein said coupling and driving means includes knob means for bringing said gear wheels into engagement against the force of the elastic means and for rotating both shafts upon said engagement.

9. For use in display devices, a composite sheet assembly carrying a design, comprising:
a plurality of separate sheets of birefractive material with design areas superimposed in register of design of the several sheets, with the direction of birefringency selectively different for different sheets;
means for joining to each other registering portions of said separate sheets for securing said register while leaving the remaining portions of the sheets separate; and
dichroic material applied to selected design areas of each sheet to render the sheets selectively polarizing in said areas, respectively, in accordance with said direction of birefringency.

References Cited
UNITED STATES PATENTS

| | | | |
|---|---|---|---|
| 2,092,761 | 9/1937 | Klein | 40—28.1 |
| 2,163,298 | 6/1939 | Wamser | 40—132 |
| 2,165,974 | 7/1939 | Land | 40—130 |
| 2,340,863 | 2/1944 | Carpenter | 40—28.1 |
| 2,561,790 | 7/1951 | Elms | 40—112 |
| 2,622,356 | 12/1952 | Valente | 40—132 |
| 2,646,636 | 7/1953 | Gandee | 40—106.1 X |
| 2,795,067 | 6/1957 | Walker | 40—152.2 X |
| 2,882,631 | 4/1957 | Boone | 40—130 |
| 2,846,799 | 8/1958 | Viszlocky | 40—130 |
| 3,054,204 | 9/1962 | Yates | 40—130 |

FOREIGN PATENTS 286,701  3/1953  Switzerland.

EUGENE R. CAPOZIO, *Primary Examiner.*
W. J. CONTRERAS, *Examiner.*